United States Patent [19]
Gilmore et al.

[11] Patent Number: 4,915,014
[45] Date of Patent: Apr. 10, 1990

[54] DISK HARROW HYDRAULIC WING BALANCING SYSTEM

[75] Inventors: Micahel R. Gilmore, Davenport, Iowa; Warren L. Thompson, Colona, Ill.

[73] Assignee: Deere & Company, Moline, Ill.

[21] Appl. No.: 891,837

[22] Filed: Aug. 1, 1986

Related U.S. Application Data

[62] Division of Ser. No. 731,699, May 8, 1985, Pat. No. 4,630,526.

[51] Int. Cl.⁴ .................. E15B 13/06; A01B 73/00
[52] U.S. Cl. ............................ 91/420; 172/311; 172/316; 280/405.1
[58] Field of Search ............. 172/311, 316, 328, 413, 172/456; 280/405.1, 43.23; 91/420, 421, 452, 517, 518

[56] References Cited

U.S. PATENT DOCUMENTS

| 3,824,896 | 7/1974 | Tull, III ..................... 91/452 X |
| 4,379,491 | 4/1983 | Riewerts et al. ............... 172/328 |
| 4,412,758 | 11/1983 | Heitkamp et al. ............ 91/420 X |
| 4,700,784 | 10/1987 | Wiebe et al. .............. 280/43.23 X |

FOREIGN PATENT DOCUMENTS 8607521  12/1986  PCT Int'l Appl. ................. 172/456

OTHER PUBLICATIONS

"Hydraulics, Theory and Applications", Werner Götz for Robert Bosch GmbH, 1984, p. 235.
Sun, Reducing/Relieving Valves, (prior art but date is unknown) p. 7.02.

*Primary Examiner*—Randolph A. Reese
*Assistant Examiner*—Jeffrey L. Thompson

[57] ABSTRACT

A weight-balancing system for a farm implement, such as a disk harrow with foldable wings operated by wing-fold cylinders, includes a selective control valve for controlling fluid communication to the head and rod ends of the wingfold cylinders. A pair of pressure-reducing/relieving valves permit individual adjustment of the pressures in both the head and rod ends to achieve the desired balance. In a preferred embodiment, a pilot-operated, two-position valve is connected between the rod ends and one of the pressure-responsive valves. The two-position valve is operated by pressure signals generated by a flow-responsive switching valve connected between the two-position valve and the selective control valve. The switching valve and the two-position valve cooperate to block the pressure-controlled outlet of the one pressure-responsive valve and the rod ends and to bypass return fluid flow from the rod ends to sump when the cylinders are being extended. Then, when cylinder motion stops and this return flow ends, the switching valve and the two-position valve are connected to the control pressure outlet of the one pressure-responsive valve to the rod ends to achieve the desired balance.

4 Claims, 3 Drawing Sheets

DISK HARROW HYDRAULIC WING BALANCING SYSTEM

This is a division of application Ser. No. 731,699, filed 8May 1985, now U.S. Pat. No. 4,630,526.

BACKGROUND OF THE INVENTION

This invention relates to a hydraulic system for controlling the weight transfer between the main frame and wing sections of an agricultural implement, such as a disk harrow.

One type of current disk harrow has a main frame and one or two wings which are attached pivotally (or hinged) with respect to the main frame. The main frame and the wings support gangs of disks which are drawn through the soil. In such disk harrows, the characteristic working or thrust force, due to implement-ground interaction, can create functional problems as soil conditions vary. These thrust forces act along the gang to create a moment about the hinge centerline of the wing which tends to pull the wing into the soil. Firm soils generate high thrust forces while loose soils generate relatively low forces. As a result, in firm soils, the wings may tend to penetrate deeper than the main frame while in loose soils, the wings tend to ride out. The result is unsatisfactory performance, i.e., ridging, incomplete cutout due to lack of penetration, etc. The weight balance between the wings and main frame is a delicate design parameter and is difficult to optimize for different wing sizes and soil conditions. Oftentimes, narrow wings tend to ride out and wide wings tend to penetrate too deeply, or vice versa. Currently, these problems are addressed by adding ballast to wing frames, by using compression springs in wingfold cylinders, and by using additional gang wheels on large wings. However, adjustment of ballast or of gauge wheels is inconvenient so that it is difficult to quickly adjust to changing soil conditions. Compression springs have a disadvantage in that the force they provide varies, depending upon the relative position between the main frame and the wing. Accordingly, some other more convenient system for adjusting disk harrow weight balance is desired.

SUMMARY OF THE INVENTION

An object of the present invention is to provide a disk harrow, weight transfer or ground-engaging force control system which is simple to adjust.

Another object of the present invention is to provide disk harrow main frame to wing weight transfer by controlling fluid pressure in the wingfold cylinders.

A further object is to provide such a weight transfer system wherein the weight transfer forces are independent of wing position.

Another object is to provide a weight-balancing system in which wing folding and unfolding can be controlled via a single lever and with which the wingfold cylinders can be locked or floated.

Another object is to maintain constant weight transfer independent of relative position of wing frame to main frame.

A further object of this invention is to provide such a system using only a remote control valve such as a four-position, four-way valve with float, such as typically used on agricultural tractors.

These and other advantages are achieved by the present invention wherein a pair of adjustable pressure-reducing/relieving valves are included in the hydraulic circuit which controls the unfolding and folding of the wings by extending and retracting hydraulic cylinders. The hydraulic circuit includes a 4-position, 4-way selective control valve connected to a pump and a reservoir. One pressure-reducing/relieving valve is coupled between one outlet of the control valve and the head ends of the wingfold cylinders. A second pressure-reducing/relieving valve is connected between another outlet of the control valve and the rod ends of the cylinders. Thus, weight transfer can be achieved by individual adjustment of the fluid pressures in the head and rod ends of the wingfold cylinders.

A preferred embodiment also includes a pair of hydraulic wingfold cylinders, a pump, a reservoir and a selective control valve for controlling communication therebetween. A pair of pressure-reducing/relieving valves separately control the pressures in the head and rod ends of the cylinders. Both pressure-reducing/relieving valves have high pressure inlets connected to the same outlet port of the selective control valve. The controlled pressure outlet of one pressure-reducing/relieving valve is coupled directly to the head ends. The controlled pressure outlet of the other pressure-reducing/relieving valve is coupled to the rod ends via a two-position valve. A flow-responsive switching valve generates pressure signals which operate the two-position valve. During wing folding, (cylinder retraction), these valves operate to pressurize the cylinder rod ends while connecting the head ends to reservoir. The valves automatically shift from a wing folding mode to an unfolding mode in response to shifting of the selective control valve. During wing unfolding (cylinder extension), the switching valve and the two-position valve operate to bypass return fluid from the rod ends to sump without passing through the other pressure-reducing/relieving valve and to block communication between the rod ends and the controlled pressure outlet of the other pressure-reducing/relieving valve. Then, when the wings are unfolded and cylinder motion stops, the switching valve and the two-position valve operate to automatically connect the controlled pressure outlet of the other pressure-reducing/relieving valve to the rod ends to achieve the desired weight balancing.

DETAILED DESCRIPTION

Figure 1:
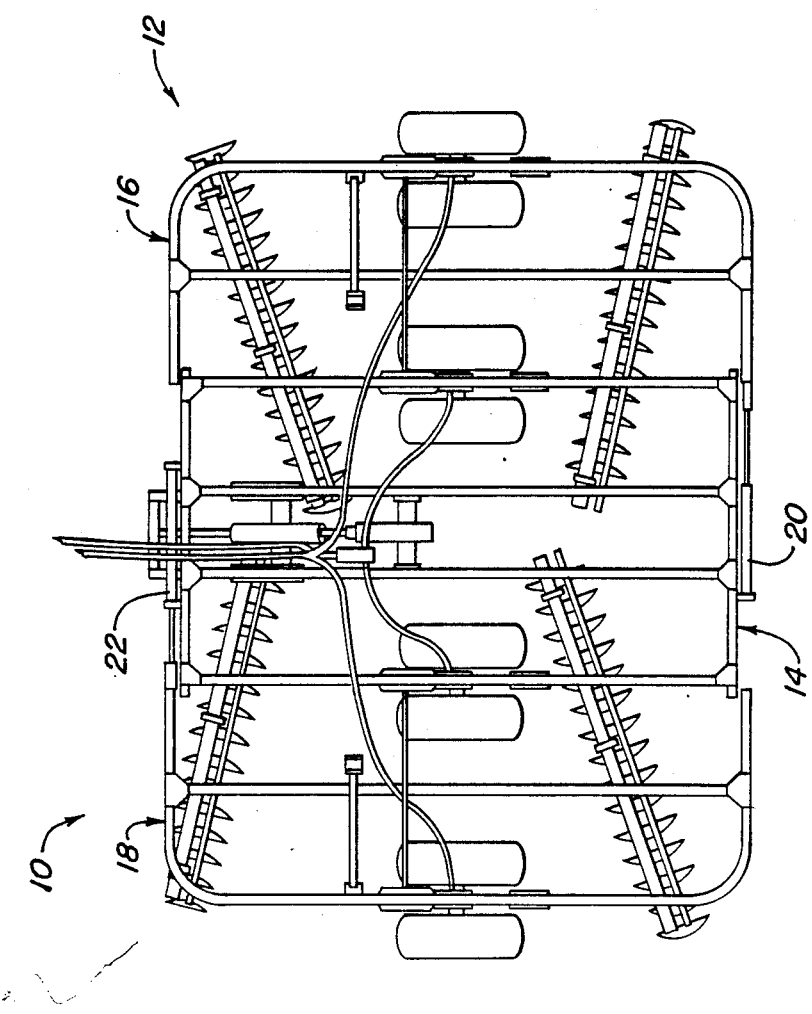
FIG. 1 is a top view of a conventional disk harrow with a main frame, a pair of wings and a pair of wingfold hydraulic cylinders.

Referring to FIG. 1, a conventional disk harrow 10 includes a flexible 3-part frame 12 with a main section 14, and right and left wing sections 16 and 18, respectively. A wing-folding function is provided by wingfold hydraulic cylinders 20 and 22.

Figure 2:
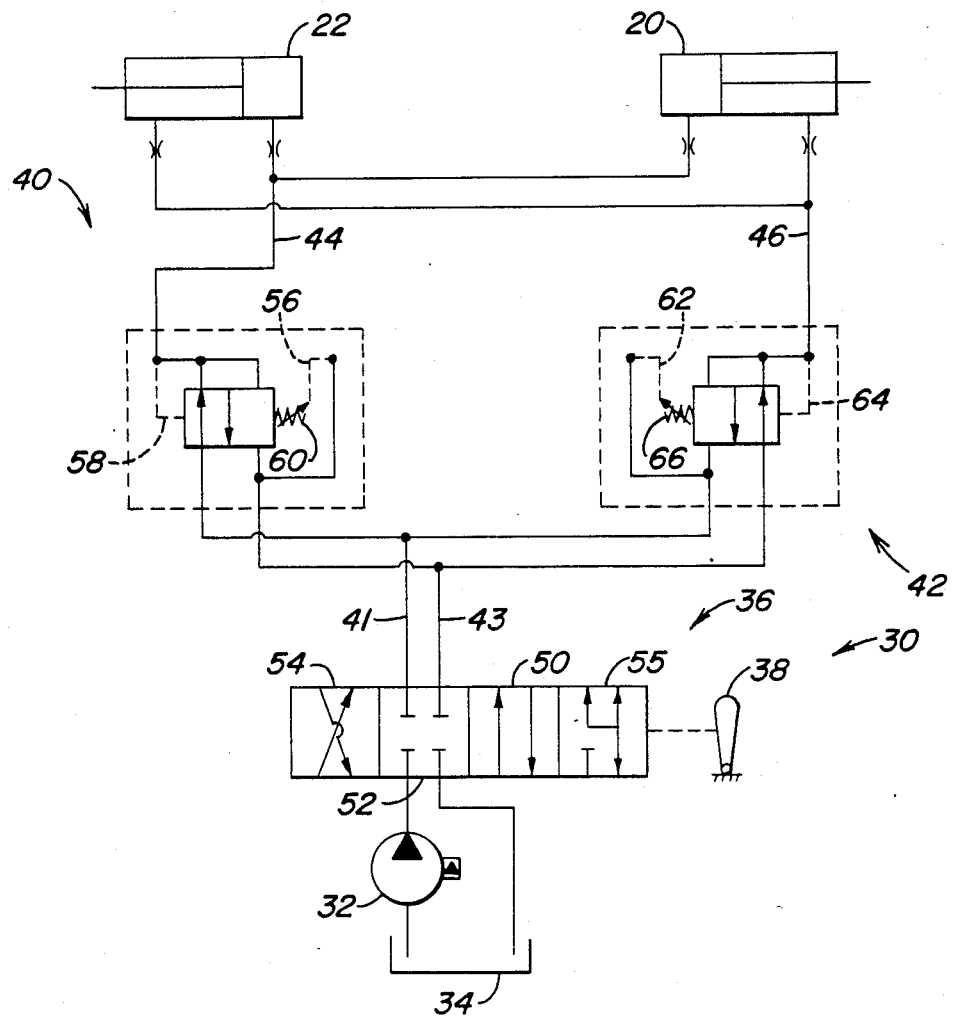
FIG. 2 is a hydraulic circuit diagram of a weight transfer system according to the present invention.

Referring now to FIG. 2, a hydraulic circuit 30 controls fluid flow to and from the cylinders 20 and 22. Circuit 30 includes a pump 32, a reservoir 34 and a 4-way, 4-position detent-held selective control valve 36 which may be mechanically connected to a manually operated control lever 38. Circuit 30 also includes pressure-reducing/relieving valves 40 and 42 which may be reducing/relieving valve model PPDB made by Sun Hydraulics. Lines 41 and 43 connect valve 36 to valves 40 and 42. Valve 40 controls communication of lines 41 and 43 with the head end of cylinders 20 and 22 via line 44. Valve 42 controls communication of lines 41 and 43 with the rod ends of cylinders 20 and 22 via line 46.

Valve 36 includes an extend or unfold position 50, a shut-off position 52, a retract or fold position 54 and a float position 55. Valve 40 has opposed pressure-operated pilots 56 and 58 and is spring-biased towards its illustrated position by manually adjustable spring 60. Pilots 56 and 58 are connected to lines 43 and 44, respectively.

Valve 42 has opposed pressure-operated pilots 62 and 64 which are connected to lines 41 and 46, respectively. Valve 42 is spring-biased to its illustrated position by manually adjustable spring 66.

When valve 36 is moved to the extend position 50, then line 41 is connected to pump 32 and line 43 is connected to sump 34. Valve 40 communicates a reduced pressure (0–700 psi, determined by the adjustment of manually adjustable spring 60) via line 44 to the head ends of cylinders 20 and 22. At the same time, pump pressure is communicated to pilot 62 of valve 42 while sump pressure is communicated to pilot 64. Thus, valve 42 will connect the rod ends of cylinders 20 and 22 to sump 36 and the cylinders will extend. When the wings are unfolded and cylinder motion stops, then the amount of downward wing force can be controlled by adjusting spring 60 of valve 40, which permits a pressure variation of 0 to 700 psi for the pressure in the head ends of cylinders 20 and 22.

If, after the wings are unfolded, it is desired to reduce the downward wing force by pressurizing the rod ends of cylinders 20 and 22, then control valve 36 should be shifted to and held in its retract position 54. This pressurizes line 43 and connects sump 34 to line 41. With line 43 pressurized, valve 40 is held in the position shown so that the head ends of cylinders 20 and 22 are connected to sump. At the same time, pressure-reducing/relieving valve 42 will pressurize line 46 and the rod ends of cylinders 20 and 22 to the pressure determined by pressure-adjust spring 66 (0–2500 psi).

To fold the wings or retract the cylinders, the pressure-adjusting spring 66 on valve 42 must be adjusted to maximize the pressure in line 46. Then, the control valve 36 is moved to position 54, whereupon valve 42 connects pump 32 to the rod ends of the cylinders 20 and 22 while valve 40 connects the head ends to sump 34. Thus, with hydraulic circuit 30, the wings 16 and 18 may be folded or unfolded and the pressure in both the head and rod ends of cylinders 20 and 22 may be adjusted.

Figure 3:
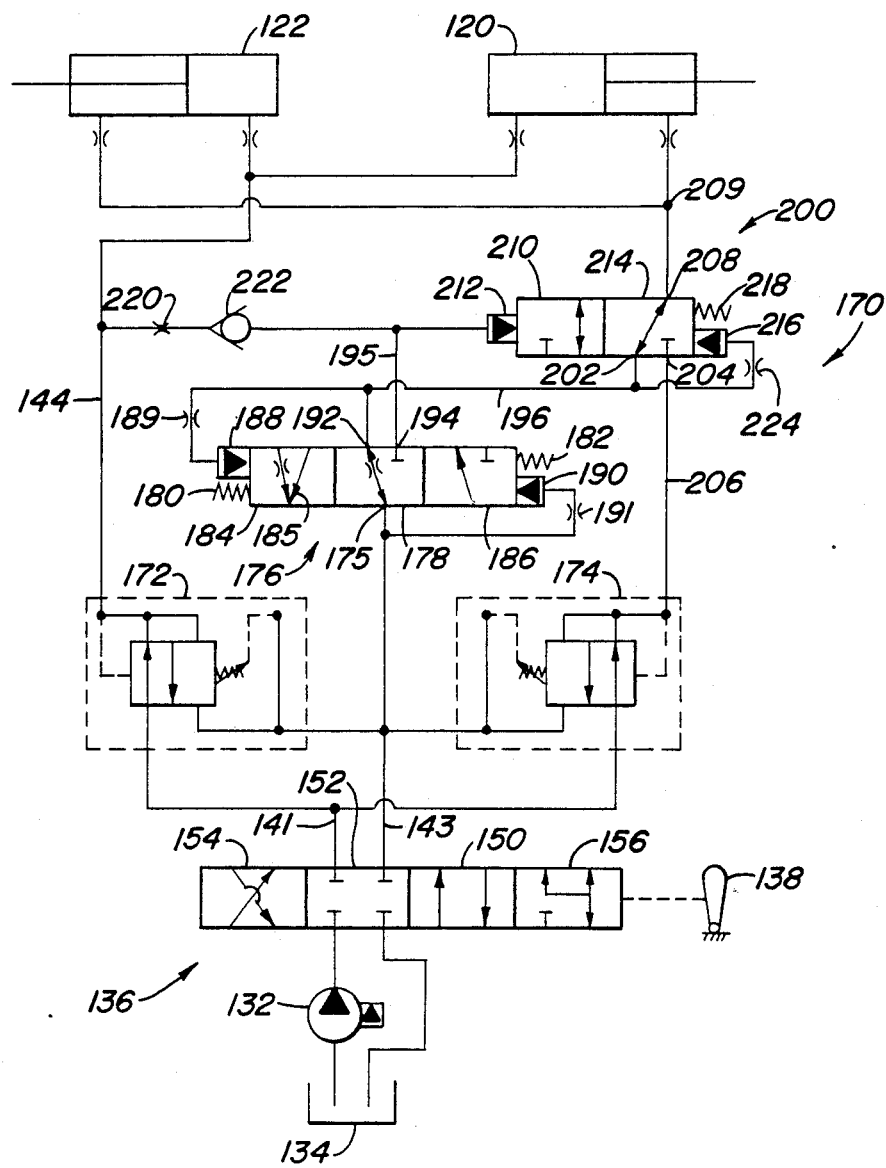
FIG. 3 is a hydraulic circuit diagram of a preferred embodiment of the present invention.

Referring now to FIG. 3, the hydraulic circuit 170 controls the cylinders 120 and 122. Circuit 170 includes a pump 132, a reservoir 134 and a 4-way, 4-position, detent held selective control valve 136 which may be mechanically connected to a manually-operated control lever 138. Control valve 136 has a stop position 152, an extend position 150, a retract position 154 and a float position 156. The hydraulic circuit 170 includes a pair of pressure-reducing/relieving valves 172 and 174, such as reducing/relieving valve model PPDB, made by Sun Hydraulics. Valves 172 and 174 are connected to one port of control valve 136 via line 141. Valve 172 is preferably factory adjusted so that the maximum pressure in line 144 and in the head end of cylinders 120 and 122 is 750 psi, whereas valve 174 may be operator-adjusted to achieve a desired rod end pressure. Both valves 172 and 174 are connected to another port of control valve 136 via line 143.

Line 143 is also connected to port 175 of 3-position switching valve 176. Valve 176 is spring-loaded to an intermediate position 178 by springs 180 and 182, and is urged to positions 184 and 186 by pressure-operated pilots 188 and 190, respectively. Valve 176 also has ports 192 and 194. Port 192 is connected to pilot 188 via a restriction 189 and is connected to line 196. Pilot 190 is connected to line 143 via a restriction 191. Port 194 is coupled to line 195.

The circuit 170 also includes a two-position valve 200 with a port 202 connected to line 196, a port 204 connected to valve 174 via line 206, and a port 208 which is coupled to the rod ends of cylinders 120 and 122 via line 209. Valve 200 is urged towards a position 210 by pilot 212 and towards position 214 by pilot 216 and spring 218. Pilot 212 is connected to port 194 of switching valve 176 and to line 144 via restriction 220 and check valve 222. Pilot 216 is connected to line 196 via restriction 224.

MODE OF OPERATION

Assuming that the cylinders 120 and 122 are retracted, (and the wings folded), they may be extended by shifting valve 136 to position 150, whereupon fluid flows from pump 132 to the head ends of cylinders 120 and 122 via line 141, valve 172 and line 144. The cylinders 120 and 122 extend and fluid flows out of the rod ends to the reservoir 134 via line 209, valve 200 (position 214), valve 176 (position 178), line 143 and control valve 136. This creates a pressure differential between ports 192 and 175 of valve 176 which shifts valve 176 to position 184 wherein passage 185 vents line 195 to sump. This maintains low pressure at pilot 212 and keeps valve 200 in position 214, as illustrated. Restriction 220 is made small enough to prevent pressurized fluid from bypassing the cylinders 120 and 122. Thus, the return fluid flow from the rod ends to sump bypasses the pressure-reducing/relieving valve 174. Because of this, pressure-reducing/relieving valve 174 can be set to any desired setting and the resulting pressure in line 206 is blocked by valve 200 so that this pressure does not reduce the force which extends the cylinders when control valve 136 is initially in position 150 and oil is flowing. The check valve 222 prevents fluid flow from the rod ends back to the head ends if the control valve 136 is moved to position 152 before complete cylinder extension is achieved so that the wings can be stopped in a partly unfolded position.

When the wings are unfolded and the motion of cylinders 120 and 122 stops, the flow across valve 176 ends, thus removing the differential pressure between ports 192 and 175, and valve 176 shifts back to its center position 178 wherein line 195 is blocked. Then, the full 750 psi pressure from line 144 is applied to pilot 212 to shift valve 200 to position 210 wherein the rod ends of cylinders 120 and 122 are connected to valve 174 via port 208, port 204 and line 206. At this point, the downward or upward force on wings 16 and 18 is automatically adjusted according to the setting of adjusting valve 174.

To retract cylinders 120 and 122 and fold the wings, valve 136 is shifted to position 154 to pressurize line 143 and pilot 190. This shifts valves 172 and 174 to the positions shown. It also shifts valve 176 to position 186 and valve 200 to position 214, whereupon fluid flows from pump 132 to the rod ends of cylinders 120 and 122 via valve 136, line 143, valve 176, line 196, valve 200 and line 209, thereby bypassing valve 174 so that full pump pressure is available for wing folding. At the same time, fluid from the head ends of cylinders 120 and 122 flows to sump via line 144, valve 172, line 141 and valve 136.

Thus, the pressure-reducing/relieving valve 174 (which controls pressurization of the rod ends) can be preset to any desired pressure. Then, during wing fold or unfold, this preset pressure does not reduce the force tending to extend or retract the cylinders, but when the wings are unfolded and cylinder motion stops, this preset pressure is automatically applied to the rod ends to oppose the head end pressure from pressure-reducing-/relieving valve 172, thus automatically achieving the desired wing force or weight balance.

In the stop position 152 of valve 136, both lines 141 and 143 are blocked. Valve 200 assumes position 214 communicating line 209 with blocked line 143. Valve 172 assumes the position shown and communicates line 144 with blocked line 141. As a result, flow is blocked in lines 144 and 209 and the cylinders 120 and 122 are immobilized. This stop mode is needed to halt motion during a folding or unfolding cycle, such as to prevent a wing from striking an obstruction.

In the float position 156 of valve 136, lines 141 and 143 are both connected to reservoir 134. Valves 172, 176 and 200 assume the same positions which they assume in the stop mode so that lines 144 and 209 are both communicated with each other and with the reservoir. This allows free motion of the cylinders 120 and 122. This float mode is useful in the case of a system malfunction or in the case where the disk is operated in soil where no weight transfer is needed.

In addition to weight balancing, this invention has other applications in the agricultural implement area. One such application would be disk harrow front-to-rear leveling. Front-to-rear leveling is used to control the relative disking depth of the front and rear gangs. Disk leveling is important to ensure uniform soil cutout and to maintain a level soil surface across the width of the machine. Some current level action disks use a mechanical linkage to control front-to-rear leveling. The linkage utilizes the relative position of the hitch to the main frame to control the compression of the leveling spring which, when relaxed, lets the front gangs penetrate deeper and, when compressed, pulls the front gangs out of the soil. The same effect could be realized if the leveling linkage were removed, a hydraulic cylinder installed between the hitch and main frame and the present balancing system installed to control the position of the cylinder. The system could be set to obtain a level disking job and the same front-to-rear disking depth would be maintained, regardless of the relative position of the hitch to the main frame (disking over small knolls or through low spots.)

Another application would be for planting unit down force control. Current planting units utilize two extension springs to create a down force to help keep the unit in the soil. This force is not constant and decreases as the planting unit flexes down. The present balancing system would be connected to a hydraulic cylinder which would replace the springs to provide a constant force on the unit. Such a system would also be adjustable to compensate for varying soil conditions.

While the invention has been described in conjuction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. In an implement having a first frame part and a second frame part movable with respect to the first frame part, one of the frame parts supporting a ground-engaging tool and a hydraulic cylinder connected between the frame parts to move the second frame part with respect to the first frame part, a control system for controlling said hydraulic cylinder, said control system comprising:
    a pump;
    a reservoir;
    a control valve for controlling fluid communication between the pump, reservoir and head and rod ends of the cylinder, the control valve having first and second control ports;
    a first pressure-reducing valve between the first control port and the head end of the cylinder, the first pressure-reducing valve having pressure-adjusting means for adjusting the fluid pressure communicated to the head end of the cylinder and having means for returning fluid from the head end of the cylinder to the control valve when the rod end of the cylinder is pressurized, the first pressure-reducing valve comprising a three-position, two-way valve having first and second inlets communicated with the first and second control ports, respectively, of the control valve, an outlet port communicated with the head end of the cylinder, a valve member movable from a first position wherein the first inlet is communicated to the outlet port and wherein the second inlet is blocked, to a second position wherein the second inlet is blocked and wherein the first inlet is communicated to the outlet port via a restriction and to a third position wherein the first inlet is blocked and wherein the outlet port is communicated to the second inlet, a first pilot communicated with the outlet port for urging the valve member to its third position, a second pilot communicated with the second inlet for urging the valve member to its first position, and adjustable biasing means to urging the valve member toward its first position; and
    a second pressure-reducing valve between the second control port and the rod end of the cylinder, the second pressure-reducing valve having pressure-adjusting means for adjusting the fluid pressure communicated to the rod end of the cylinder and having means for returning fluid from the rod end of the cylinder to the control valve when the head end of the cylinder is pressurized.

2. In an implement having a first frame part and a second frame part movable with respect to the first frame part, one of the frame parts supporting a ground-engaging tool and a hydraulic cylinder connected between the frame parts to move the second frame part with respect to the first frame part, a control system for controlling said hydraulic cylinder, said control system comprising:
    a pump;
    a reservoir;
    a control valve for controlling fluid communication between the pump, reservoir and head and rod ends of the cylinder, the control valve having first and second control ports;

a first pressure-reducing valve between the first control port and the head end of the cylinder, the first pressure-reducing valve having pressure-adjusting means for adjusting the fluid pressure communicated to the head end of the cylinder and having means for returning fluid from the head end of the cylinder to the control valve when the rod end of the cylinder is pressurized; and a second pressure-reducing valve between the second control port and the rod end of the cylinder, the second pressure-reducing valve having pressure-adjusting means for adjusting the fluid pressure communicated to the rod end of the cylinder and having means for returning fluid from the rod end of the cylinder to the control valve when the head end of the cylinder is pressurized, the second pressure-reducing valve comprising a three-position, two-way valve having a first inlet communicated with the second control port of the control valve, a second inlet communicated with the first control port of the control valve, an outlet port communicated with the rod of the cylinder, a valve member movable from a first position wherein the first inlet is communicated to the outlet port and wherein the second inlet is blocked, to a second position wherein the second inlet is blocked and wherein the first inlet is communicated to the outlet port via a restriction and to a third position wherein the first inlet is blocked and wherein the outlet port is communicated to the second inlet, a first pilot communicated with the outlet port for urging the valve member to its third position, a second pilot communicated with the second inlet for urging the valve member to its first position, and adjustable biasing means for urging the valve member toward its first position.

3. In a wheeled implement having a frame for supporting ground-engaging tools, the frame having a main section and at least one wing section pivotal with respect to the main section, and a hydraulic cylinder connected between the wing and the main section to fold and unfold the wing, a control system for controlling said hydraulic cylinder, said control system comprising:

a pump;

a reservoir;

a control valve for controlling fluid communication between the pump, reservoir and head and rod ends of the cylinder, the control valve having first and second control ports;

a first pressure-reducing valve having a first inlet communicated to the first control port, an outlet communicated with the head of the cylinder, a second inlet communicated with the second control port and pressure-adjusting means for varying the fluid pressure communicated from the first inlet to the outlet and the head end of the cylinder, the first pressure-reducing valve comprising a three-position, two-way valve having first and second inlets communicated with the first and second control ports, respectively, of the control valve, an outlet port communicated with the head end of the cylinder, a valve member movable from a first position wherein the first inlet is communicated to the outlet port and wherein the second inlet is blocked, to a second position wherein the second inlet is blocked and wherein the first inlet is communicated to the outlet port via a restriction and to a third position wherein the first inlet is blocked and wherein the outlet port is communicated to the second inlet, a first pilot communicated with the outlet port for urging the valve member to its first position, and adjustable biasing means for urging the valve member toward its first position; and a second pressure-reducing valve having a first inlet communicated with the second control port, an outlet communicated with the rod end of the cylinder, a second inlet communicated with the first control port, an pressure-adjusting means for varying the fluid pressure communicated from the first inlet to the outlet and to the rod end of the cylinder.

4. In a wheeled implement having a frame for supporting ground-engaging tools, the frame having a main section and at last one wing section pivotal with respect to the main section, and a hydraulic cylinder connected between the wing and the main section to fold and unfold the wing, a control system for controlling said hydraulic cylinder, said control system comprising:

a pump;

a reservoir;

a control valve for controlling fluid communication between the pump, reservoir and head and rod ends of the cylinder, the control valve having first and second control ports;

a first pressure-reducing valve having a first inlet communicated to the first control port, an outlet communicated with the head end of the cylinder, a second inlet communicated with the second control port and pressure-adjusting means for varying the fluid pressure communicated from the first inlet to the outlet and the head end of the cylinder; and a second pressure-reducing valve having a first inlet communicated with the second control port, an outlet communicated with the rod end of the cylinder, a second inlet communicated with the first control port, and pressure-adjusting means for varying the fluid pressure communicated from the first inlet to the outlet and to the rod end of the cylinder, the second pressure-reducing valve comprising a three-position, two-way valve having a first inlet communicated with the second control port of the control valve, a second inlet communicated with the first control port of the control valve, an outlet port communicated with the rod end of the cylinder, a valve member movable from a firs position wherein the first inlet is communicated to the outlet port and wherein the second inlet is blocked, to a second position wherein the second inlet is blocked and wherein the fist inlet is communicated to the outlet port via a restriction and to a third position wherein the first inlet is blocked and wherein the outlet port is communicated to the second inlet, a first pilot communicated with the outlet port or urging the valve member to its third position, a second pilot communicated with the second inlet for urging the valve member to its first position, and adjustable biasing means for urging the valve member toward its first position.

* * * * *

UNITED STATES PATENT AND TRADEMARK OFFICE
CERTIFICATE OF CORRECTION

PATENT NO. : 4,915,014

DATED : 10 April 1990

INVENTOR(S) : Michael Robert Gilmore et al.

It is certified that error appears in the above-identified patent and that said Letters Patent is hereby corrected as shown below:

In Col. 6, line 47, delete "to" and insert -- for --.

In Col. 7, line 24, after "rod", insert -- end --.

In Col. 7, line 54, after "head", insert -- end --.

UNITED STATES PATENT AND TRADEMARK OFFICE
CERTIFICATE OF CORRECTION

PATENT NO. : 4,915,014
DATED : 10 April 1990
INVENTOR(S) : Michael R. Gilmore et al.

It is certified that error appears in the above-identified patent and that said Letters Patent is hereby corrected as shown below:

In Col. 8, line 20, delete "last" and insert -- least --.

In Col. 8, line 52, delete "firs" and insert -- first --.

In Col. 8, line 55, delete "fist" and insert -- first --.

In Col. 8, line 60, delete "or" and insert -- for --.

Signed and Sealed this

Eighteenth Day of June, 1991

*Attest:*

HARRY F. MANBECK, JR.

*Attesting Officer*     Commissioner of Patents and Trademarks